US012764513B2

(12) United States Patent
Ganesan et al.

(10) Patent No.: US 12,764,513 B2
(45) Date of Patent: Oct. 13, 2026

(54) SIDELINK DEVICE DISCOVERY

(71) Applicant: Lenovo (Singapore) Pte. Ltd., New Tech Park (SG)

(72) Inventors: Karthikeyan Ganesan, Kronberg im Taunus (DE); Prateek Basu Mallick, Dreieich (DE); Joachim Loehr, Wiesbaden (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 579 days.

(21) Appl. No.: 18/020,051

(22) PCT Filed: Aug. 6, 2021

(86) PCT No.: PCT/IB2021/057288
§ 371 (c)(1),
(2) Date: Feb. 6, 2023

(87) PCT Pub. No.: WO2022/029725
PCT Pub. Date: Feb. 10, 2022

(65) Prior Publication Data

US 2023/0292098 A1 Sep. 14, 2023

Related U.S. Application Data

(60) Provisional application No. 63/062,345, filed on Aug. 6, 2020.

(51) Int. Cl.
*H04W 4/00* (2018.01)
*H04W 8/00* (2009.01)
*H04W 92/18* (2009.01)

(52) U.S. Cl.
CPC ............ *H04W 8/005* (2013.01); *H04W 92/18* (2013.01)

(58) Field of Classification Search
CPC ....... H04W 8/005; H04W 8/00; H04W 92/18; H04W 36/0079; H04W 84/047; H04W 36/0082; H04W 84/053
(Continued)

(56) References Cited

U.S. PATENT DOCUMENTS 10,257,677 B2 * 4/2019 Baghel .................. H04W 76/11
10,367,677 B2 * 7/2019 Parkvall .............. H04L 41/0233
(Continued)

FOREIGN PATENT DOCUMENTS

EP 3121974 A1 * 1/2017 ............ H04W 88/04
EP 3121974 B1 * 11/2017 ............ H04W 8/005
(Continued)

OTHER PUBLICATIONS

PCT/IB2021/057288, "Notification of Transmittal of the International Search Report and the Written Opinion of the International Searching Authority, or the Declaration", International Searching Authority, Jan. 31, 2022, pp. 1-19.
(Continued)

*Primary Examiner* — Marceau Milord
(74) *Attorney, Agent, or Firm* — Kunzler Needham Hilton

(57) ABSTRACT

Apparatuses, methods, and systems are disclosed for sidelink device discovery. One method includes transmitting, at a first sidelink device and over a sidelink interface, a periodic discovery message for performing discovery of at least one second sidelink device. The method includes discovering the at least one second sidelink device over the sidelink interface. The method includes transmitting at least one source layer 2 identifier of the at least one second sidelink device discovered by the first sidelink device to a third wireless device.

20 Claims, 10 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 10,764,805 | B2 * | 9/2020 | Dou | H04W 8/005 |
| 11,558,917 | B2 * | 1/2023 | Hong | H04W 36/362 |
| 11,711,869 | B2 * | 7/2023 | Li | H04W 80/10 370/329 |
| 11,849,382 | B2 * | 12/2023 | Xu | H04W 76/14 |
| 11,856,623 | B2 * | 12/2023 | Paladugu | H04L 5/0048 |
| 11,924,895 | B2 * | 3/2024 | Damnjanovic | H04W 8/24 |
| 11,968,633 | B2 * | 4/2024 | Luo | H04L 5/0053 |
| 12,047,826 | B2 * | 7/2024 | Stojanovski | H04W 36/0064 |
| 2010/0260126 | A1 * | 10/2010 | Ulupinar | H04W 92/20 370/329 |
| 2013/0065620 | A1 * | 3/2013 | Jovicic | H04W 8/005 455/500 |
| 2018/0213577 | A1 * | 7/2018 | Burbidge | H04W 76/10 |
| 2018/0332519 | A1 * | 11/2018 | Dou | H04W 8/005 |
| 2019/0357101 | A1 * | 11/2019 | Stojanovski | H04W 36/302 |
| 2020/0084697 | A1 * | 3/2020 | Sridhara | H04W 48/10 |
| 2020/0260463 | A1 * | 8/2020 | Lovlekar | H04W 76/15 |
| 2021/0068187 | A1 * | 3/2021 | Baghel | H04W 76/23 |
| 2021/0099338 | A1 * | 4/2021 | Cheng | H04L 41/0686 |
| 2021/0259034 | A1 * | 8/2021 | Damnjanovic | H04W 24/02 |
| 2021/0282098 | A1 * | 9/2021 | Luo | H04L 5/0053 |
| 2021/0298043 | A1 * | 9/2021 | He | H04W 28/0278 |
| 2022/0132617 | A1 * | 4/2022 | Hong | H04W 76/14 |
| 2023/0126466 | A1 * | 4/2023 | Pan | H04W 76/23 455/11.1 |

FOREIGN PATENT DOCUMENTS

| | | | | |
|---|---|---|---|---|
| EP | 3500046 A1 | | 6/2019 | |
| EP | 3512275 A1 | | 7/2019 | |
| WO | WO-2017017887 A1 | * | 2/2017 | H04B 7/15557 |
| WO | WO-2018016882 A1 | * | 1/2018 | H04W 8/005 |

OTHER PUBLICATIONS

Qualcomm Inc., "Introduction of eD2D", 3GPP TSG-RAN WG2 #92 R2-157152, Nov. 16-20, 2015, pp. 1-19.
Thomson et al., "IPv6 Stateless Address Autoconfiguration", Network Working Group RFC 4862, Sep. 2007, pp. 1-30.
OPPO, "New SID: Study on NR sidelink relay", 3GPP TSG RAN Meeting #86 RP-193253, Dec. 9-12, 2019, pp. 1-5.
Sony, "Considerations on ProSe Relays Selection", SA WG2 Meeting #105 S2-143134, Oct. 13-17, 2014, pp. 1-7.
3GPP, "3rd Generation Partnership Project; Technical Specification Group Services and System Aspects; Architecture enhancements for 5G System (5GS) to support Vehicle-to-Everything (V2X) services (Release 16)", 3GPP TS 23.287 V16.3.0, Jul. 2020, pp. 1-57.
3GPP, "3rd Generation Partnership Project; Technical Specification Group Services and System Aspects; Security aspects of 3GPP support for advanced Vehicle-to-Everything (V2X) services (Release 16)", 3GPP TS 33.536 V16.0.0, Jul. 2020, pp. 1-23.
3GPP, "3rd Generation Partnership Project; Technical Specification Group Radio Access Network; NR; Multiplexing and channel coding (Release 16)", 3GPP TS 38.212 V16.2.0, Jun. 2020, pp. 1-151.
3GPP, "3rd Generation Partnership Project; Technical Specification Group Radio Access Network; NR; Physical layer procedures for control (Release 16)", 3GPP TS 38.213 V16.2.0, Jun. 2020, pp. 1-176.
3GPP, "3rd Generation Partnership Project; Technical Specification Group Radio Access Network; NR; Physical layer procedures for data (Release 16)", 3GPP TS 38.214 V16.2.0, Jun. 2020, pp. 1-163.
3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

* cited by examiner

SIDELINK DEVICE DISCOVERY

CROSS-REFERENCE TO RELATED APPLICATIONS

This application claims priority to U.S. patent application Ser. No. 63/062,345 entitled "APPARATUSES, METHODS, AND SYSTEMS FOR DETERMINATION OF A DISCOVERY MEMBER LIST BY A DISCOVERY MECHANISM OF A RELAY UE" and filed on Aug. 6, 2020 for Karthikeyan Ganesan, which is incorporated herein by reference in its entirety.

FIELD

The subject matter disclosed herein relates generally to wireless communications and more particularly relates to sidelink device discovery.

BACKGROUND

In certain wireless communications networks, sidelink communication may be used. Devices for sidelink communication may need to be identified.

BRIEF SUMMARY

Methods for sidelink device discovery are disclosed. Apparatuses and systems also perform the functions of the methods. One embodiment of a method includes transmitting, at a first sidelink device and over a sidelink interface, a periodic discovery message for performing discovery of at least one second sidelink device. In some embodiments, the method includes discovering the at least one second sidelink device over the sidelink interface. In certain embodiments, the method includes transmitting at least one source layer 2 identifier of the at least one second sidelink device discovered by the first sidelink device to a third wireless device.

One apparatus for sidelink device discovery includes a first sidelink device. In some embodiments, the apparatus includes a transmitter that transmits, over a sidelink interface, a periodic discovery message for performing discovery of at least one second sidelink device. In various embodiments, the apparatus includes a processor that discovers the at least one second sidelink device over the sidelink interface. In certain embodiments, the transmitter transmits at least one source layer 2 identifier of the at least one second sidelink device discovered by the first sidelink device to a third wireless device.

Another embodiment of a method for relay reselection includes communicating, using a first sidelink interface of a first sidelink device, with a second sidelink device. The second sidelink device communicates with a third sidelink device using a second sidelink interface. In some embodiments, the method includes receiving a radio link failure indication from the second sidelink device. The radio link failure indication indicates a radio link failure condition for the second sidelink interface between the second sidelink device and third sidelink device. In certain embodiments, the method includes performing relay reselection based on the radio link failure indication from the second sidelink device.

Another apparatus for relay reselection includes a first sidelink device. In some embodiments, the apparatus includes a transceiver that: communicates, using a first sidelink interface, with a second sidelink device, wherein the second sidelink device communicates with a third sidelink device using a second sidelink interface; and receives a radio link failure indication from the second sidelink device. The radio link failure indication indicates a radio link failure condition for the second sidelink interface between the second sidelink device and third sidelink device. In various embodiments, the apparatus includes a processor that performs relay reselection based on the radio link failure indication from the second sidelink device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
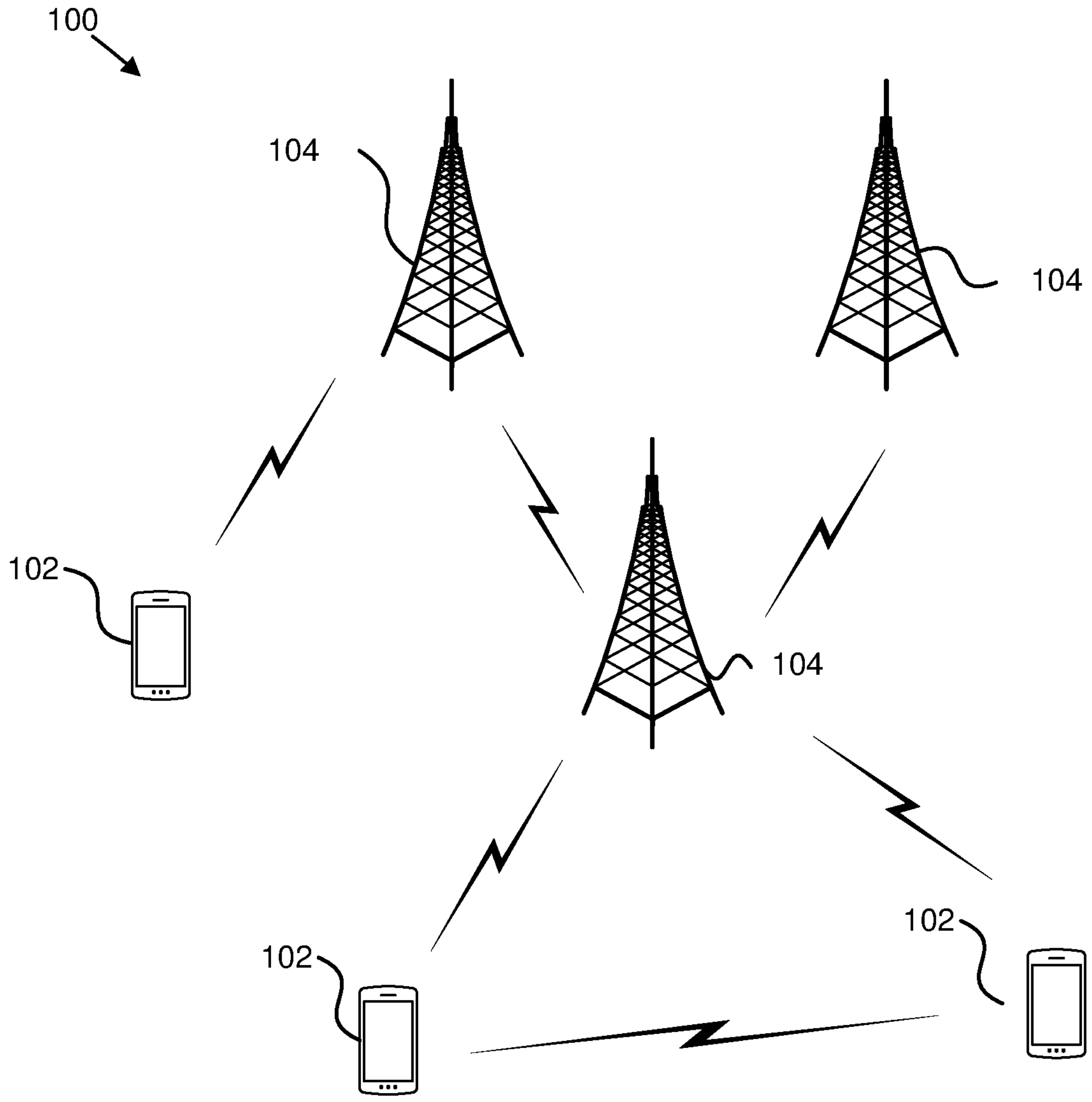
FIG. 1 is a schematic block diagram illustrating one embodiment of a wireless communication system for sidelink device discovery.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for sidelink device discovery. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may transmit, at a first sidelink device and over a sidelink interface, a periodic discovery message for performing discovery of at least one second sidelink device. In some embodiments, the remote unit 102 discover the at least one second sidelink device over the sidelink interface. In certain embodiments, the remote unit 102 transmit at least one source layer 2 identifier of the at least one second sidelink device discovered by the first sidelink device to a third wireless device. Accordingly, the remote unit 102 may be used for sidelink device discovery.

In certain embodiments, a remote unit 102 may communicate, using a first sidelink interface of a first sidelink device, with a second sidelink device. The second sidelink device communicates with a third sidelink device using a second sidelink interface. In some embodiments, the remote unit 102 receive a radio link failure indication from the second sidelink device. The radio link failure indication indicates a radio link failure condition for the second sidelink interface between the second sidelink device and third sidelink device. In certain embodiments, the remote unit 102 perform relay reselection based on the radio link failure indication from the second sidelink device. Accordingly, the remote unit 102 may be used for relay reselection.

Figure 2:
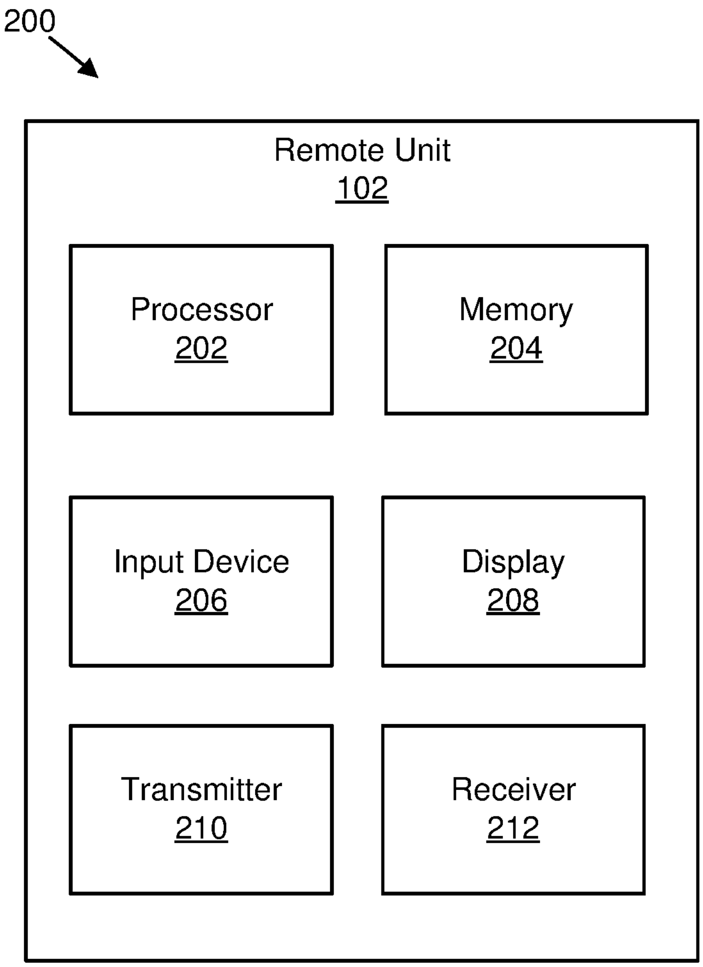
FIG. 2 is a schematic block diagram illustrating one embodiment of an apparatus that may be used for sidelink device discovery.

FIG. 2 depicts one embodiment of an apparatus 200 that may be used for sidelink device discovery. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the transmitter 210 transmits, over a sidelink interface, a periodic discovery message for performing discovery of at least one second sidelink device. In various embodiments, the processor 202 discovers the at least one second sidelink device over the sidelink interface. In certain embodiments, the transmitter 210 transmits at least one source layer 2 identifier of the at least one second sidelink device discovered by the first sidelink device to a third wireless device.

In some embodiments, the transceiver: communicates, using a first sidelink interface, with a second sidelink device, wherein the second sidelink device communicates with a third sidelink device using a second sidelink interface; and receives a radio link failure indication from the second sidelink device. The radio link failure indication indicates a radio link failure condition for the second sidelink interface between the second sidelink device and third sidelink device. In various embodiments, the processor 202 performs relay reselection based on the radio link failure indication from the second sidelink device.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
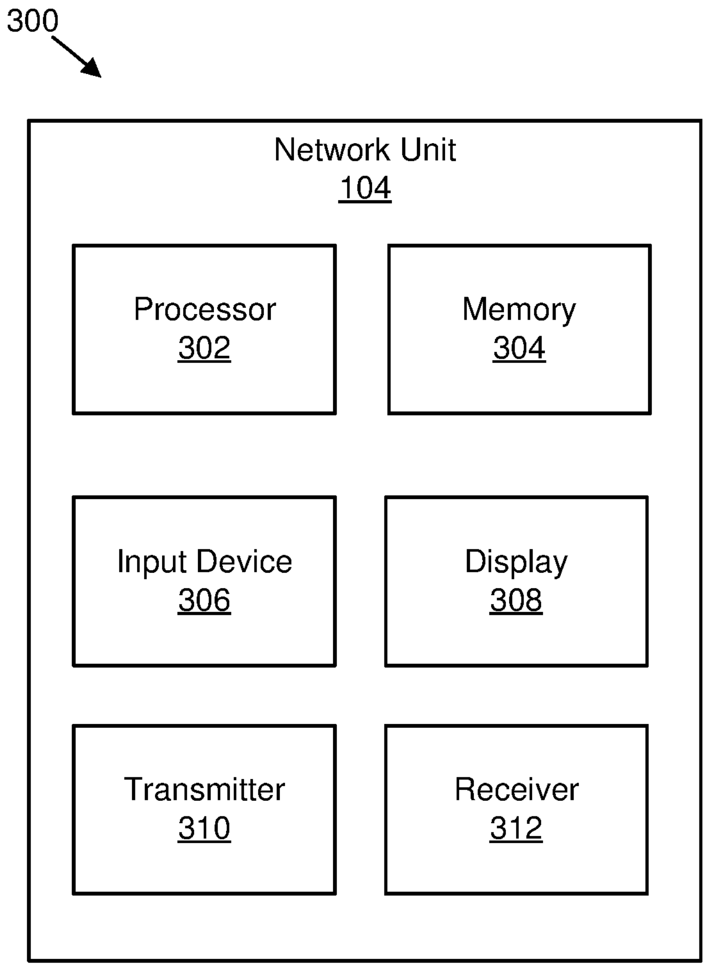
FIG. 3 is a schematic block diagram illustrating one embodiment of an apparatus that may be used for sidelink device discovery.

FIG. 3 depicts one embodiment of an apparatus 300 that may be used for sidelink device discovery. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, there may be two types of relays: 1) UE-to-network coverage extension: UE to network ("Uu") interface coverage reachability may be necessary for UEs to reach a server in a packet data network ("PDN") or counterpart user equipment ("UE") out of a proximity area—various embodiments for UE-to-network relays may be limited to evolved universal terrestrial access ("EU-TRA") based technologies, and may not be applied to an NR-based system (e.g., for both next generation ("NG") radio access network ("RAN") ("NG-RAN") and NR-based sidelink communications); and 2) UE-to-UE coverage extension: current proximity reachability may be limited to a single-hop sidelink link either via EUTRA-based or NR-based sidelink technology—this may not be sufficient if there is no Uu coverage, considering a limited single-hop sidelink coverage.

In various embodiments, for both sidelink ("SL") relay types, a SL remote UE may discover and select a relay for transmissions to another SL remote UE. In certain embodiments, a reliability requirement is 10^−5 and may increase with public safety. In some embodiments, communication applications like industrial internet of things ("IIoT") and other applications may use sidelink and may require higher reliability and extended coverage. A SL relay may be used to increase coverage using one or more hops. Various embodiments found herein may be used to achieve higher reliability and extended coverage.

In certain embodiments, a SL relay may facilitate increasing coverage using one or multiple hops. Embodiments described herein may be used to achieve higher reliability and coverage. In some embodiments, there may be a discovery mechanism for a relay UE to determine a member list of remote UEs from its vicinity. In various embodiments, additional parameters may be determined for preparing a discovery member list by a relay UE. In certain embodiments, a UE to UE relay establishment and selection (or reselection) may be based on a discovery member list.

As used herein, the term eNB and/or gNB may be used for a base station, but may be replaceable by any other radio access node (e.g., base station ("BS"), eNB, gNB, access point ("AP"), new radio ("NR"), and so forth. Moreover, while various embodiments described herein may be in relation to a fifth generation ("5G") NR system, the mailing address may be equally applicable to other mobile communication systems supporting serving cells and/or carriers configured for sidelink communication over a UE to UE ("PC5") interface.

It should be noted that the following terminology is used in this document: 1) UE-to-network relay: N-relay; 2) UE-to-UE relay: UE-relay; 3) Relay=either a UE-to-network relay or a UE-to-UE relay; 4) Remote UE: either TX remote UE or RX remote UE; and 5) Candidate Relay: second relay UE.

Figure 4:
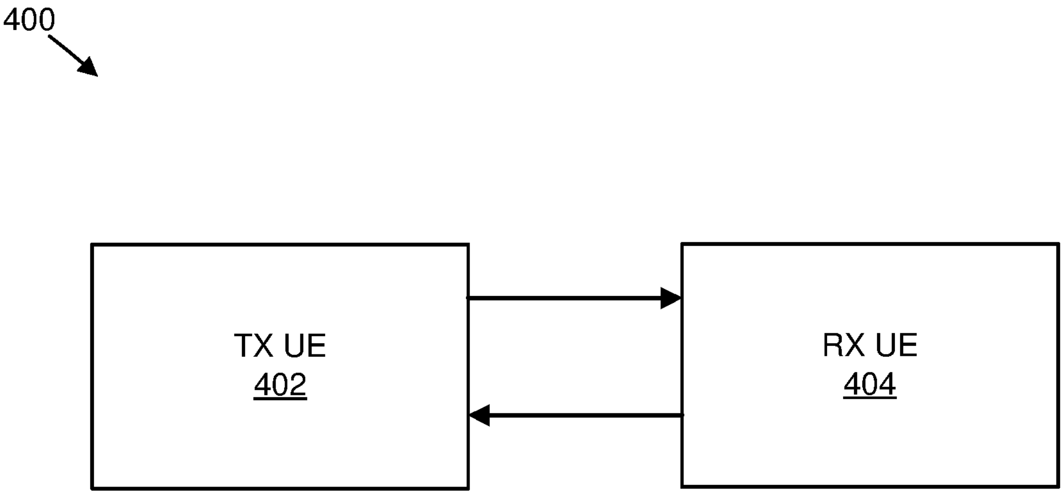
FIG. 4 is a schematic block diagram illustrating one embodiment of a system for sidelink communications.

FIG. 4 is a schematic block diagram illustrating one embodiment of a system 400 for sidelink communications. The system 400 includes a TX UE 402 and an RX UE 404. The TX UE 402 may transmit to the RX UE 404 a source identifier ("ID") of the TX UE 402 and/or a destination ID from a higher layer. Moreover, the RX UE 404 may transmit to the TX UE 402 a source ID of the RX UE 404 and/or a destination ID from a higher layer.

It should be noted that the term source layer 2 ("L2") ID may be used in various embodiments described herein. Moreover, the source L2 ID of an RX UE may be identical to a destination L2 ID if the RX UE plays the role of a transmitter UE for a transmission.

Figure 5:
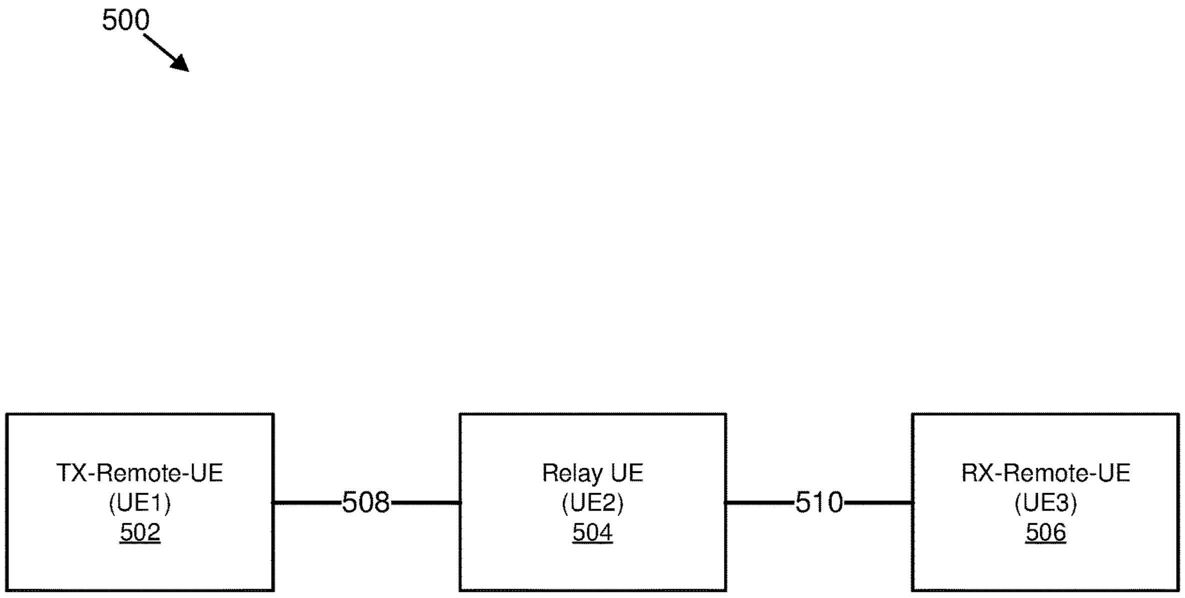
FIG. 5 is a schematic block diagram illustrating one embodiment of a system for relay communications.

FIG. 5 is a schematic block diagram illustrating one embodiment of a system 500 for relay communications. The system 500 includes a UE1 502 (e.g., TX-Remote-UE, first UE, one or more transmit ("TX") UEs), a UE2 504 (e.g., relay UE, second UE), and a UE3 506 (e.g., RX-Remote-UE, third UE, one or more receive ("RX") UEs). The UE1 502 communicates with the UE2 504 over a first interface 508, while the UE2 504 communicates with the UE3 506 over a second interface 510.

The UE1 502 is a UE that has some application data to be sent to another remote UE (UE3 506) via a relay (UE2 504). It should be noted that, the UE3 506 may have data to send to the UE1 502 via the UE2 504 (in this context UE3 506 would take the role of a transmitter UE). Accordingly, the terms and roles shown in FIG. 5 may be with respect to a particular data packet. In some embodiments, more than one relay is used (e.g., UE2a and UE2b), thus the UE2 504 may be a generalized representation of one or more relay UEs. In various embodiments, UE3 506 may act as a relay UE to another UE (e.g., UE4).

In a first embodiment, there may be an exchange of a sidelink discovery member list containing information about a list of source L2 IDs configured at a remote UE. In the first embodiment, a UE may support multiple discovery model mechanisms. Each of the discovery model mechanisms may be triggered to be used by the UE by the higher layer based on the purpose of discovery. Certain examples are shown in FIGS. 6A, 6B, and 7.

Figure 6A:
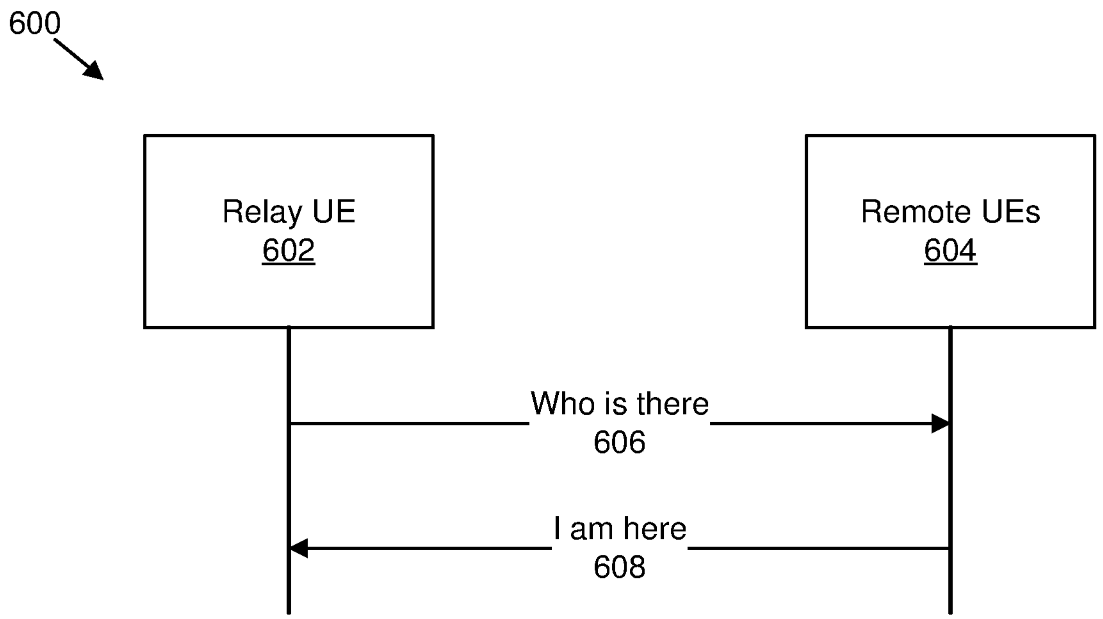
FIG. 6A is a schematic block diagram illustrating one embodiment of a system including a discovery model mechanism.

In one implementation of the first embodiment, a discovery model mechanism may be triggered by a relay UE to create a list of discovered members (e.g., FIG. 6A). In another implementation of the first embodiment, a discovery model mechanism may be triggered for discovering a relay UE by a remote UE and/or second relay UE (e.g., FIG. 6B). In a further implementation of the first embodiment, a discovery model mechanism may be triggered by a remote UE seeking to transmit to a remote UE. The discovery request from a TX remote UE may be relayed to an RX remote UE to establish a connection between the TX remote UE and the RX remote UE (e.g., FIG. 7).

FIG. 6A is a schematic block diagram illustrating one embodiment of a system 600 including a discovery model mechanism. The system 600 includes a relay UE 602 and one or more remote UEs 604. The relay UE 602 may transmit a first message 606 (e.g., "who is there" message) to the one or more remote UEs 604 to discover what remote UEs are present. Further, the one or more remote UEs 604 may transmit a second message 608 (e.g., "I am here" message) to the relay UE 602 to indicate the discovered one or more remote UEs 604.

Figure 6B:
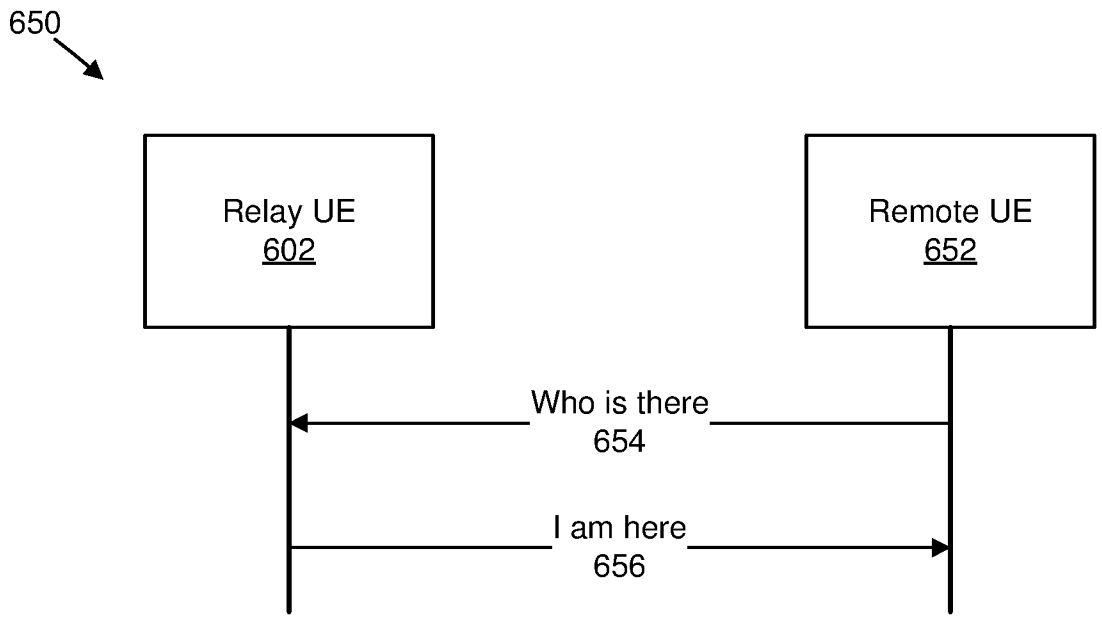
FIG. 6B is a schematic block diagram illustrating another embodiment of a system including a discovery model mechanism.
Figure 7:
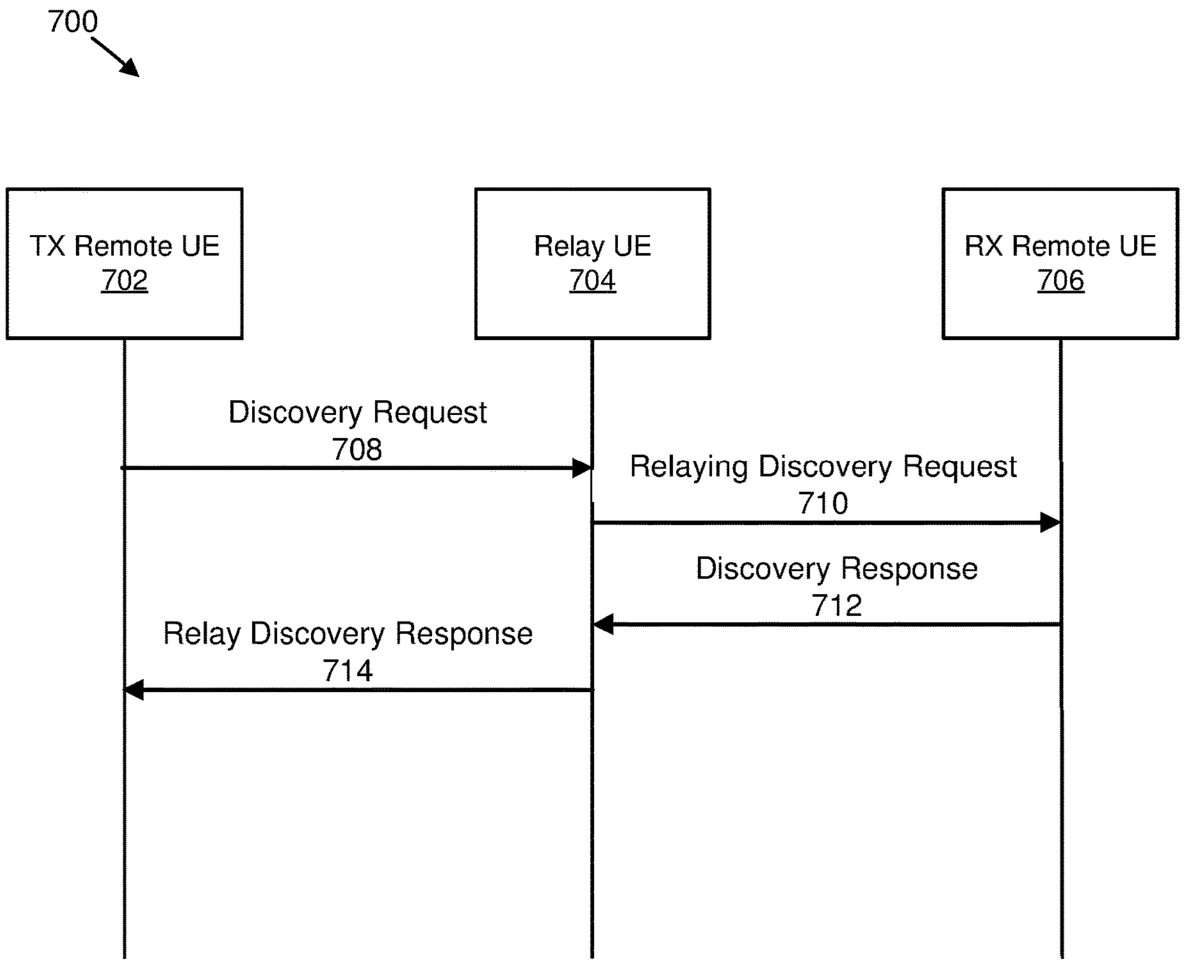
FIG. 7 is a schematic block diagram illustrating a further embodiment of a system including a discovery model mechanism.

FIG. 6B is a schematic block diagram illustrating another embodiment of a system 650 including a discovery model mechanism. The system 650 includes the relay UE 602 and a remote UE 652. The remote UE 652 may transmit a first message 654 (e.g., "who is there" message) to the relay UE 602 to discover the relay UE 602. Further, the relay UE 602 may transmit a second message 656 (e.g., "I am here" message) to the remote UE 652 to indicate the discovered relay UE 602.

FIG. 7 is a schematic block diagram illustrating a further embodiment of a system 700 including a discovery model mechanism for relaying discovery messages. The system 700 includes a TX remote UE 702, a relay UE 704, and an RX remote UE 706. The TX remote UE 702 transmits a discovery request 708 to the relay UE 704. Moreover, the relay UE 704 transmits a relayed discovery request 710 to the RX remote UE 706. Further, the RX remote UE 706 transmits a discovery response 712 to the relay UE 704, and the relay UE 704 transmits a relayed discovery response 714 to the TX remote UE 702.

As shown in FIG. 7, the relay UE 704 may help establish a unicast connection between the TX remote UE 702 and the RX remote UE 706 by relaying the discovery request message from the TX remote UE 702 containing a source ID and/or destination ID from the TX remote UE 702 and relaying back the discovery response message from the RX remote UE 706 to the TX remote UE 702.

Moreover, as shown in FIGS. 6A and 6B as one of the discovery mode mechanism, a sidelink discovery member list may be prepared at a relay UE using a periodic transmission of sidelink discovery request transmission of "who is there" broadcast messages by using a default source ID and/or destination ID that is configured to be received by all discoverable UEs. In various embodiments, a default ID may be defined per service type.

In certain embodiments, as part of receiving a periodic transmission of an "I am here" unicast discovery response from remote UEs, the unicast message from the remote UEs may contain one or more parameters such as: a list of source L2 IDs in which a source L2 ID corresponds to an application at the remote UE (e.g., mapping of a source ID to a physical identity of a UE), a SL radio network temporary identifier ("RNTI"), a current zone ID of the remote UE, a reference signal received power ("RSRP") value (e.g., layer 3 ("L3") and/or layer 1 ("L1")) measured between the relay UE and remote UE interface, and/or a periodicity of traffic (e.g., packet arrival time).

In some embodiments, as shown in FIGS. 6A and 6B, as one of the discovery mode mechanisms, a sidelink discovered relay list may be prepared at the remote UE using a periodic transmission of sidelink discovery request transmission of "who is there" broadcast messages by using a default source ID and/or destination ID that is configured to be received by all discoverable relay UEs and one or more additional parameters about a type of service requested from the relay UE. Such embodiments may receive periodic transmissions of "I am here" unicast discovery responses from relay UEs, where the unicast message from relay UEs may contain one or more of parameters such as: a source L2 ID, a SL RNTI, a current zone ID of the relay UE, an RSRP value (e.g., L3 and/or L1) measured between the relay UE and remote UE interface, information about a relay UE load, a number of served remote UEs, and/or a number of supported slice types in a UE to network ("Uu") interface.

In various embodiments, there may be an event triggered discovery response message indicating a new source L2 ID or a change in a source L2 ID. In such embodiments, a remote UE may transmit an event triggered unicast message if the event may be triggered due to a change in and/or a removal of one or more source L2 IDs and/or an addition of source L2 IDs (e.g., corresponding to a new application (or due to determination that a relay needs to be used for this source L2 ID) at the remote UE. A relay UE may be made aware of an updated list of source L2 IDs belonging to the remote UE.

In certain embodiments, removal of source L2 IDs and replacement of existing source L2 IDs with new ones may be done using indexes of lists of source IDs shared between a pair of remote and relay UEs. A remote UE may signal a new source L2 ID for replacing a current source L2 ID at a corresponding index.

In some embodiments, a remote UE may indicate to a relay (e.g., in a discovery response message) about the purpose of discovery by signaling purpose information. The purpose information may include information such as TX only, RX only, or both TX and RX applicable for user data (e.g., physical sidelink shared channel ("PSSCH")). In one implementation of such embodiments, a "TX only discovery purpose" implies that a remote UE may only transmit user data to the relay UE towards one or more remote UEs but may not receive any user data from the relay UE (e.g., except perhaps control channel signaling like hybrid automatic repeat request ("HARQ") feedback and channel state information ("CSI") reports). In another implementation of such embodiments, an "RX only discovery purpose" implies that a remote UE may only receive user data from the relay UE and may not transmit any user data to the relay UE (e.g., except perhaps control channel signaling like HARQ feedback and CSI reports). In various embodiments, for "TX only discovery purpose", a relay UE may not advertise such source IDs to any other remote UE.

In certain embodiments, sidelink reference signals ("RS") such as sidelink CSI RS ("CSI-RS") or any SL RS ("SL-RS") may be embedded within a sidelink discovery request broadcast transmission and the discovery response from the remote UE may contain information about a best beam ID based on a measured RSRP from multiple beams. A RS comb pattern, port, and so forth of the reference signal may be fixed to a default configuration and/or may be signaled in sidelink control information ("SCI").

In some embodiments, there may be an exchange of discovery member lists between peer relay UEs. In such embodiments, a relay UE may exchange a list of discovered remote UEs connected to the relay UE along with a set of corresponding source L2 IDs of each RX remote UE with peer relay UEs. The peer relay UEs may exchange the list of discovered remote UEs periodically, may exchange an updated list of discovered remote UEs with an event triggered higher layer signaling such as UE to UE ("PC5") interface radio resource control ("RRC"), and/or may use sidelink assistance information signaling between them.

In various embodiments, a relay UE may check a source L2 ID from discovered member lists. In such embodiments, a TX remote UE may transmit a discovery request message to establish a PC5 unicast connection containing information about the source and/or destination L2 ID of a neighboring RX remote UE. If an RX remote UE is not physically reachable, one or more relay UEs may compare the source and/or destination L2 ID in the discovery request message from its discovery member list and may transmit a discovery response back to the TX remote UE only if the source and/or destination L2 ID is part of the discovery member list.

In certain embodiments, there may be a discovery member list exchange between a relay UE and a gNB and/or a candidate relay ID exchange between a remote UE and a gNB. In such embodiments, there may be a periodic exchange of information about the discovery member list between each relay UE and the gNB and one or more additional parameters containing sidelink RSRP values, sidelink pathloss, and/or zone IDs so that the gNB may select and/or reselect a relay UE for indirect communication with an RX remote UE. In one implementation of such embodiments, a UE may signal a discovery member list as part of UE assistance information or RRC signaling.

In some embodiments, each RX remote UE may share a UE ID of corresponding discovered candidate relay IDs with a gNB along with additional parameters containing sidelink RSRP values, sidelink pathloss, and/or zone IDs. In such embodiments, the UE may signal discovered candidate relay IDs as part of UE assistance information or RRC signaling.

In various embodiments, remote UEs may inform a relay UE about their source L2 IDs (or a significant part such as 16 most significant bits). A source L2 ID may be provided by upper layers. The relay UE may use this information to create a mapping table that contains a mapping between SL RNTI ("SL-RNTI") and corresponding source L2 IDs, such as shown in Table 1.

TABLE 1

| Mapping Between SL-RNTIs and L2 Source IDs | |
|---|---|
| SL-RNTI | Source Layer-2 IDs |
| SL-RNTI_1 | Source Layer-2 ID_A1<br>Source Layer-2 ID_B1<br>Source Layer-2 ID_C1 |
| SL-RNTI_2 | Source Layer-2 ID_A2<br>Source Layer-2 ID_B2 |
| . . . | . . . |
| SL-RNTI_N | Empty (not a SL UE) |

Such a mapping may be used by the relay UE to know which of the multiple destinations belong to the same physical sidelink remote UE. In one example, the remote UE with SL-RNTI_1 may report that Source Layer-2 ID_A2 and Source Layer-2 ID_B2 belong to the same physical sidelink remote UE. This may enable multiple streamlining possibilities on sidelink, such as: 1) easier context maintenance: a single PC5 RRC and/or PC5 sidelink ("PC5-S") connection may be established across a pair of peer UEs rather that one per source and destination L2 IDs; 2) radio link monitoring ("RLM"): a single RLM monitoring procedure across multiple L2 IDs may be sufficient—this may save multiple CSI-RS transmissions, RLM reporting, and/or a radio link failure ("RLF") procedure; and/or 3) CSI reporting: only one CSI report across physical sidelink remote UEs.

In a second embodiment, a relay UE may provide a RLF indication about a second interface between a relay UE and an RX remote UE to a TX remote UE. In the second embodiment, an indication message containing information on a radio channel about the second interface between the relay UE and the RX remote UE may be transmitted to the TX remote UE that is connected using a first interface. The indication message may contain information about the radio link failure on the second interface that is between the relay UE and the RX remote UE.

In one implementation of the second embodiment, the TX remote UE may perform a relay selection and/or reselection mechanism and may transmit a PC5 RRC discovery request message to establish a connection with another candidate relay UE.

In another implementation of the second embodiment, the indication message may indicate a candidate relay UE identity to the TX remote UE to perform relay selection and/or reselection.

In a further implementation of the second embodiment, the indication message may provide information related to a number of consecutive packet losses, a channel busy ratio ("CBR") of a resource pool, and/or a channel occupancy ratio ("CR") of a resource pool.

In various implementations of the second embodiment, the indication message may contain information on the radio channel about the second interface between the relay UE and the RX remote UE may be transmitted to the gNB as part of UE assistance information signaling. In one example, the relay UE may inform the gNB about the radio channel of the second interface or a TX remote UE may inform the gNB about the radio channel of the second interface.

In another implementation of the second embodiment, a relay selection and/or reselection mechanism of providing identity of another candidate relay may be provided by a gNB or a TX remote UE and may autonomously start with a candidate relay selection and/or reselection using a discovery request broadcast transmission.

In a third embodiment, a relay UE may dynamically request information about a zone ID of remote UEs by triggering using SCI, MAC CE, and/or higher layer signaling. In certain embodiments, a remote UE may provide its location (e.g., zone ID) to a relay UE periodically or if the location changes (e.g., change to a new zone ID). Using this information, a relay UE calculates a distance between a TX remote UE and one or more receiver remote UEs. If the relay UE determines that all RX remote UEs are within a minimum communication range ("MCR"), the relay UE may disable a distance based HARQ feedback mechanism (e.g., use SCI Format 2B). If the relay UE determines that all RX remote UEs are outside of a MCR, the relay UE may deprioritize transmission of a corresponding transport block ("TB").

In a fourth embodiment, there may be a sidelink discontinuous reception ("DRX") configuration for a UE to UE relay. In the fourth embodiment, there may be a new sidelink DRX cycle configuration for exchanging discovery messages among sidelink UEs.

In one implementation of the fourth embodiment, a relay UE may broadcast a new sidelink DRX cycle configuration containing a starting slot offset, on-duration, and/or periodicity to remote UEs as part of a discovery request message that may be based on a service type. In another implementation of the fourth embodiment, a relay UE, after receiving a discovery response message containing information about a periodicity of traffic, a starting slot number for sidelink data transmission with the relay UE may align a DRX cycle for the rest of the RX remote UEs.

In certain implementations of the fourth embodiment, a relay UE may coordinate a sidelink DRX configuration between the first interface and the second interface to save power of the relay UE. The relay UE may provide the same sidelink DRX cycle configuration to both the TX remote UE and the RX remote UE. In one implementation of the fourth embodiment, PC5 RRC may be used to signal a sidelink DRX cycle configuration. The relay UE may provide a sidelink DRX cycle configuration pattern of offset, on-duration, and/or periodicity based on a PC5 quality indicator ("PQI") and/or logical channel ("LCH") ID request from remote UEs and the DRX cycle configuration pattern may be a subset of DRX cycle configurations supported by the relay UE.

Figure 8:
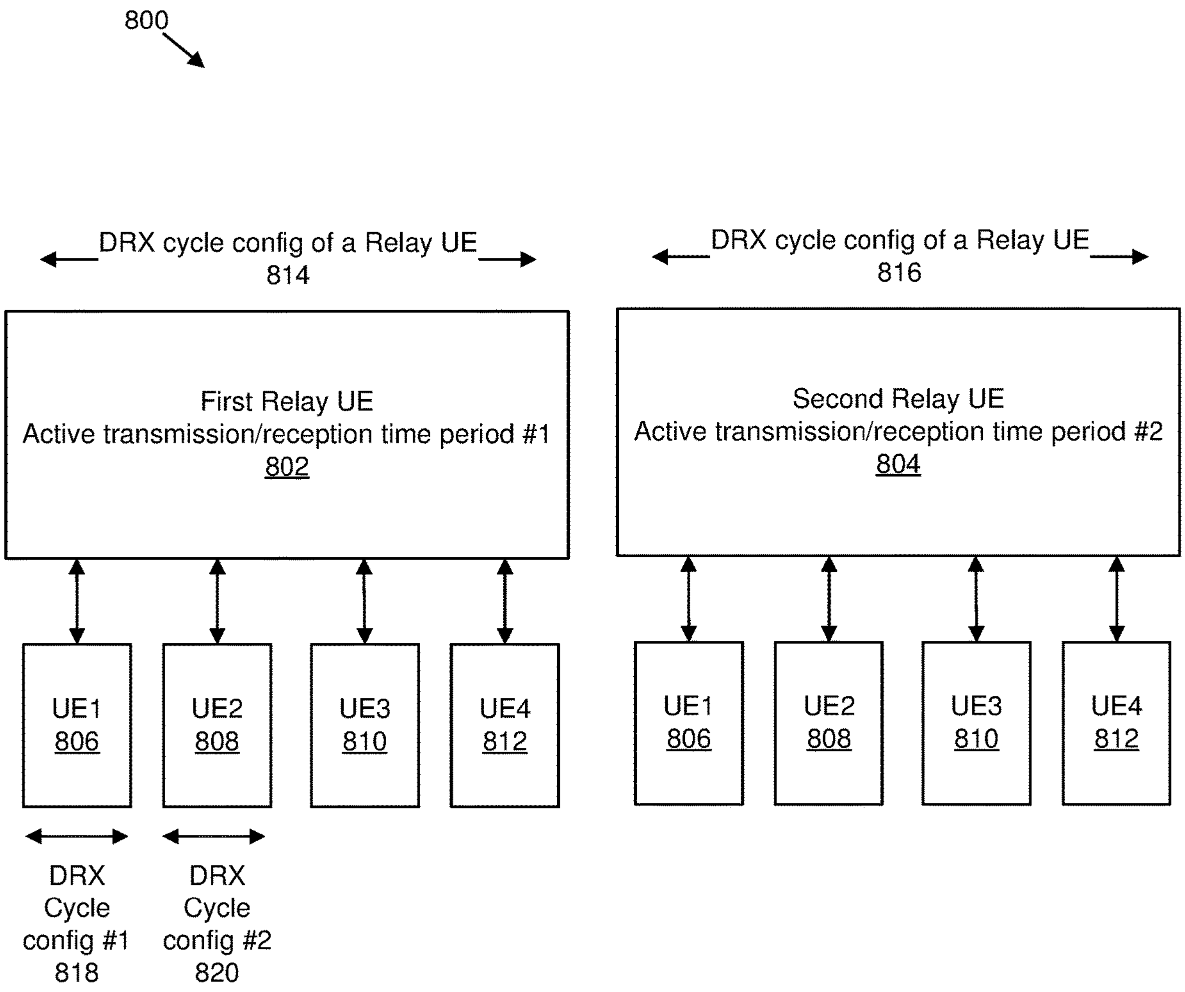
FIG. 8 is a schematic block diagram illustrating one embodiment of a system for aligning an active duration for transmission and reception in sidelink.

In various implementations of the fourth embodiment, a relay UE may provide its DRX cycle configuration on-duration, offset, and/or periodicity to one or more remote UEs, where if a relay UE is configured with a multiple sidelink DRX cycle configurations based on a PQI and/or a LCH ID, then the relay UE may signal one of its DRX cycle configurations based on the PQI and/or LCH ID traffic type requested from the remote UE. In one example, as shown in FIG. 8, remote UEs may transmit to a relay UE its corresponding on-duration and/or active reception period based on PQI. In another example, a subset of DRX cycle configurations may be derived from a relay UE's own configured DRX cycle configuration (e.g., such as multiple offsets, on-durations, periodicities as shown in FIG. 8) and provided to one or more remote UEs based on the periodicity and starting slot number of the traffic from one or more TX remote UEs.

FIG. 8 is a schematic block diagram illustrating one embodiment of a system 800 for aligning an active duration for transmission and reception in sidelink. The system 800 includes a first relay UE 802 having an active transmission and/or reception time period #1, a second relay UE 804 having an active transmission and/or reception time period

#2, a UE1 806, a UE2 808, a UE 810, and a UE 812. The first relay UE 802 has a first DRX cycle configuration 814, and the second relay UE 804 has a second DRX cycle configuration 816. Moreover, the UE1 806 has a first DRX cycle configuration 818 and the UE2 808 has a second DRX cycle configuration 820. The different DRX cycle configurations may be transmitted between devices in the system 800 to align configurations between the devices.

Figure 9:
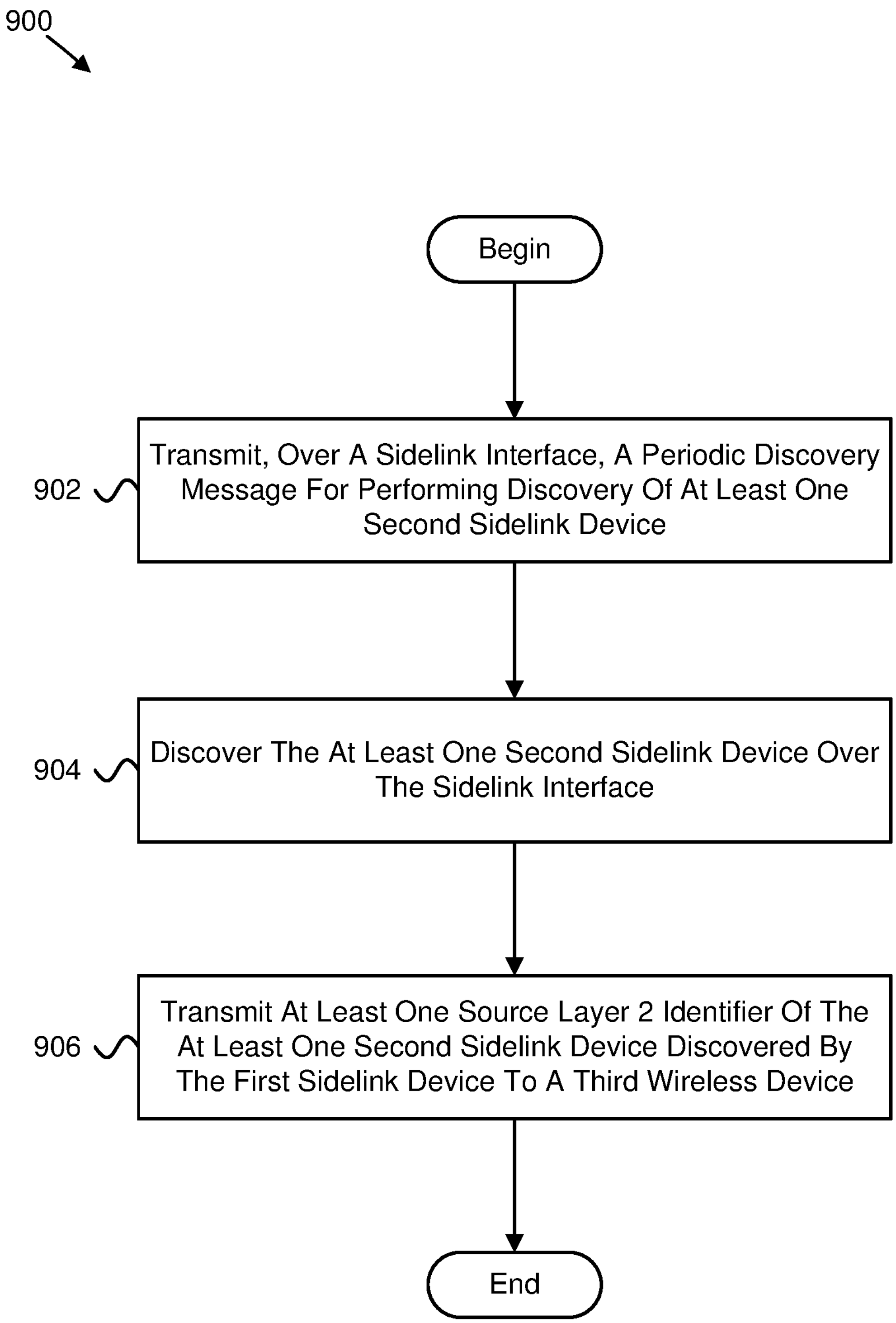
FIG. 9 is a flow chart diagram illustrating one embodiment of a method for sidelink device discovery.

FIG. 9 is a flow chart diagram illustrating one embodiment of a method 900 for sidelink device discovery. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes transmitting 902, at a first sidelink device and over a sidelink interface, a periodic discovery message for performing discovery of at least one second sidelink device. In some embodiments, the method 900 includes discovering 904 the at least one second sidelink device over the sidelink interface. In certain embodiments, the method 900 includes transmitting 906 at least one source layer 2 identifier of the at least one second sidelink device discovered by the first sidelink device to a third wireless device.

In certain embodiments, the first sidelink device is a relay user equipment, and the at least one second sidelink device is at least one remote user equipment. In some embodiments, the method 900 further comprises determining the periodic discovery message using a default source-destination identifier configured to be received by all discoverable user equipments. In various embodiments, the third wireless device comprises a base station or a sidelink relay user equipment.

In one embodiment, the method 900 further comprises receiving an event triggered discovery response message from the at least one second sidelink device, wherein the event triggered discovery response message indicates a new source layer 2 identifier or a change in the at least one source layer 2 identifier. In certain embodiments, the method 900 further comprises receiving a discovery response message from the at least one second sidelink device. The discovery response message comprises: a list of source layer 2 identifiers of which each source layer 2 identifier of the list of source layer 2 identifiers corresponds to an application a remote user equipment; a zone identifier of the remote user equipment; a reference signal received value measured over the sidelink interface; a periodicity of traffic; a discovery purpose indication; beam related information; or some combination thereof. In some embodiments, the method 900 further comprises determining a response transmission based on a discovery member list, wherein the response transmission is transmitted to a remote transmit user equipment to establish a relay connection with the remote transmit user equipment and a remote receive user equipment.

In various embodiments, the method 900 further comprises transmitting a discovery member list to a peer relay user equipment or a base station. In one embodiment, the method 900 further comprises transmitting a discovery member list as part of user equipment assistance information or radio resource control signaling. In certain embodiments, the method 900 further comprises facilitating exchanging a candidate relay identifier between a remote user equipment and a base station.

Figure 10:
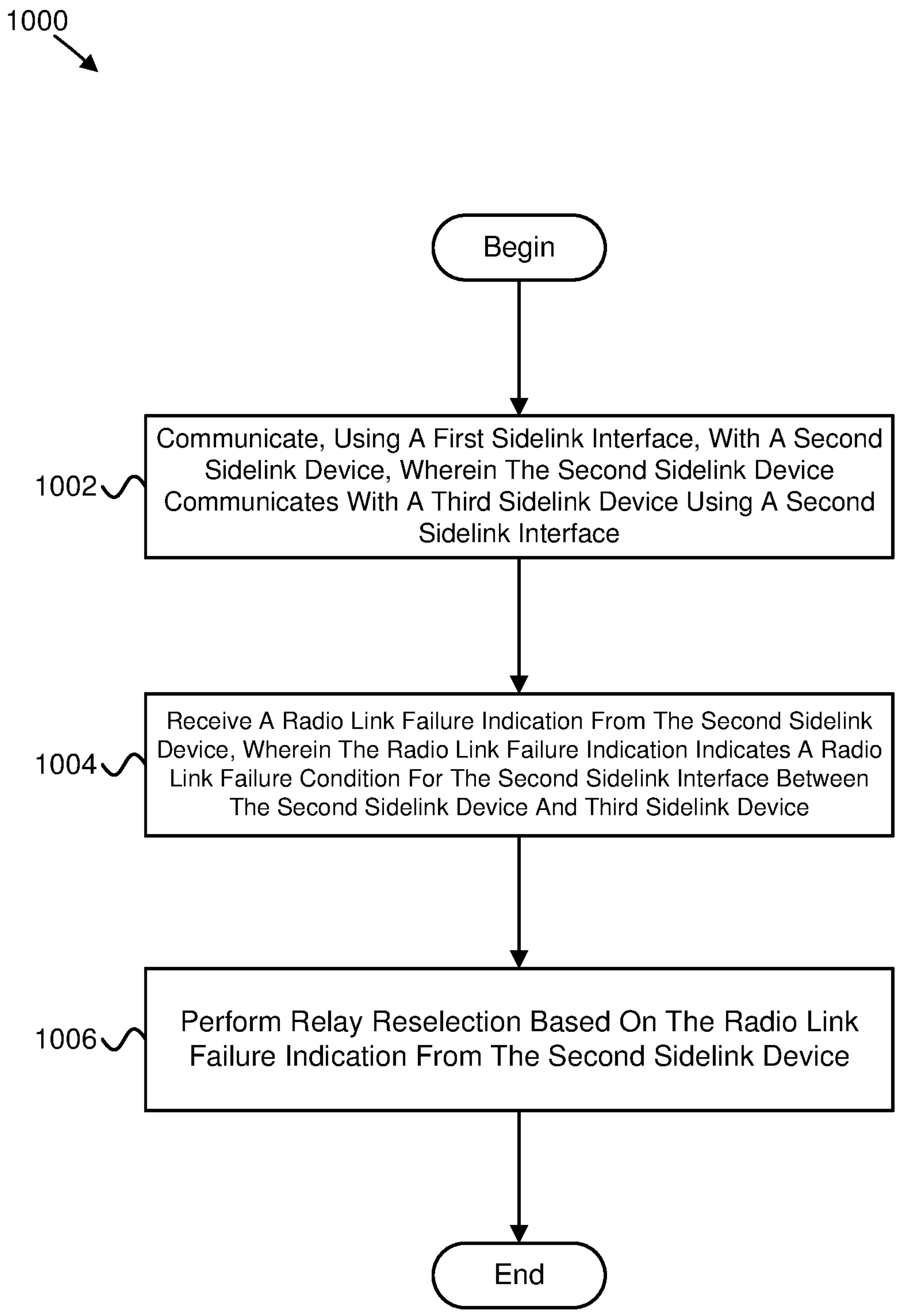
FIG. 10 is a flow chart diagram illustrating one embodiment of a method for relay reselection.

FIG. 10 is a flow chart diagram illustrating one embodiment of a method 1000 for relay reselection. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes communicating 1002, using a first sidelink interface of a first sidelink device, with a second sidelink device. The second sidelink device communicates with a third sidelink device using a second sidelink interface. In some embodiments, the method 1000 includes receiving 1004 a radio link failure indication from the second sidelink device. The radio link failure indication indicates a radio link failure condition for the second sidelink interface between the second sidelink device and third sidelink device. In certain embodiments, the method 1000 includes performing 1006 relay reselection based on the radio link failure indication from the second sidelink device.

In certain embodiments, performing relay reselection comprises transmitting a discovery request message to at least one candidate sidelink device. In some embodiments, transmitting the discovery request message comprises transmitting the discovery request message via radio resource control signaling.

In various embodiments, the radio link failure indication indicates a number of consecutive packets lost, a channel busy ratio of a resource pool, a channel occupancy ratio of the resource pool, or some combination thereof. In one embodiment, performing relay reselection comprises autonomously transmitting a broadcast discovery request message to at least one candidate sidelink device.

In one embodiment, a method at a first sidelink device comprises: transmitting, over a sidelink interface, a periodic discovery message for performing discovery of at least one second sidelink device; discovering the at least one second sidelink device over the sidelink interface; and transmitting at least one source layer 2 identifier of the at least one second sidelink device discovered by the first sidelink device to a third wireless device.

In certain embodiments, the first sidelink device is a relay user equipment, and the at least one second sidelink device is at least one remote user equipment.

In some embodiments, the method further comprises determining the periodic discovery message using a default source-destination identifier configured to be received by all discoverable user equipments.

In various embodiments, the third wireless device comprises a base station or a sidelink relay user equipment.

In one embodiment, the method further comprises receiving an event triggered discovery response message from the at least one second sidelink device, wherein the event triggered discovery response message indicates a new source layer 2 identifier or a change in the at least one source layer 2 identifier.

In certain embodiments, the method further comprises receiving a discovery response message from the at least one second sidelink device. The discovery response message comprises: a list of source layer 2 identifiers of which each source layer 2 identifier of the list of source layer 2 identifiers corresponds to an application a remote user equipment; a zone identifier of the remote user equipment; a reference signal received value measured over the sidelink interface; a periodicity of traffic; a discovery purpose indication; beam related information; or some combination thereof.

In some embodiments, the method further comprises determining a response transmission based on a discovery member list, wherein the response transmission is transmitted to a remote transmit user equipment to establish a relay connection with the remote transmit user equipment and a remote receive user equipment.

In various embodiments, the method further comprises transmitting a discovery member list to a peer relay user equipment or a base station.

In one embodiment, the method further comprises transmitting a discovery member list as part of user equipment assistance information or radio resource control signaling.

In certain embodiments, the method further comprises facilitating exchanging a candidate relay identifier between a remote user equipment and a base station.

In one embodiment, an apparatus comprises a first sidelink device. The apparatus further comprises: a transmitter that transmits, over a sidelink interface, a periodic discovery message for performing discovery of at least one second sidelink device; and a processor that discovers the at least one second sidelink device over the sidelink interface; wherein the transmitter transmits at least one source layer 2 identifier of the at least one second sidelink device discovered by the first sidelink device to a third wireless device.

In certain embodiments, the first sidelink device is a relay user equipment, and the at least one second sidelink device is at least one remote user equipment.

In some embodiments, the processor determines the periodic discovery message using a default source-destination identifier configured to be received by all discoverable user equipments.

In various embodiments, the third wireless device comprises a base station or a sidelink relay user equipment.

In one embodiment, the apparatus further comprises a receiver that receives an event triggered discovery response message from the at least one second sidelink device, wherein the event triggered discovery response message indicates a new source layer 2 identifier or a change in the at least one source layer 2 identifier.

In certain embodiments, the apparatus further comprises a receiver that receives a discovery response message from the at least one second sidelink device. The discovery response message comprises: a list of source layer 2 identifiers of which each source layer 2 identifier of the list of source layer 2 identifiers corresponds to an application a remote user equipment; a zone identifier of the remote user equipment; a reference signal received value measured over the sidelink interface; a periodicity of traffic; a discovery purpose indication; beam related information; or some combination thereof.

In some embodiments, the processor determines a response transmission based on a discovery member list, and the response transmission is transmitted to a remote transmit user equipment to establish a relay connection with the remote transmit user equipment and a remote receive user equipment.

In various embodiments, the transmitter transmits a discovery member list to a peer relay user equipment or a base station.

In one embodiment, the transmitter transmits a discovery member list as part of user equipment assistance information or radio resource control signaling.

In certain embodiments, the processor facilitates exchanging a candidate relay identifier between a remote user equipment and a base station.

In one embodiment, a method at a first sidelink device comprises: communicating, using a first sidelink interface, with a second sidelink device, wherein the second sidelink device communicates with a third sidelink device using a second sidelink interface; receiving a radio link failure indication from the second sidelink device, wherein the radio link failure indication indicates a radio link failure condition for the second sidelink interface between the second sidelink device and third sidelink device; and performing relay reselection based on the radio link failure indication from the second sidelink device.

In certain embodiments, performing relay reselection comprises transmitting a discovery request message to at least one candidate sidelink device.

In some embodiments, transmitting the discovery request message comprises transmitting the discovery request message via radio resource control signaling.

In various embodiments, the radio link failure indication indicates a number of consecutive packets lost, a channel busy ratio of a resource pool, a channel occupancy ratio of the resource pool, or some combination thereof.

In one embodiment, performing relay reselection comprises autonomously transmitting a broadcast discovery request message to at least one candidate sidelink device.

In one embodiment, an apparatus comprises a first sidelink device. The apparatus further comprises: a transceiver that: communicates, using a first sidelink interface, with a second sidelink device, wherein the second sidelink device communicates with a third sidelink device using a second sidelink interface; and receives a radio link failure indication from the second sidelink device, wherein the radio link failure indication indicates a radio link failure condition for the second sidelink interface between the second sidelink device and third sidelink device; and a processor that performs relay reselection based on the radio link failure indication from the second sidelink device.

In certain embodiments, the processor performing relay reselection comprises the transceiver transmitting a discovery request message to at least one candidate sidelink device.

In some embodiments, the transceiver transmitting the discovery request message comprises the transceiver transmitting the discovery request message via radio resource control signaling.

In various embodiments, the radio link failure indication indicates a number of consecutive packets lost, a channel busy ratio of a resource pool, a channel occupancy ratio of the resource pool, or some combination thereof.

In one embodiment, the processor performing relay reselection comprises the transceiver autonomously transmitting a broadcast discovery request message to at least one candidate sidelink device.

In certain embodiments, the first sidelink device is a relay user equipment, the at least one second sidelink device is at least one remote user equipment, and the third wireless device comprises a base station or a candidate sidelink relay user equipment.

In some embodiments, the method further comprises relaying a discovery request message from a transmitter device to at least one remote user equipment.

In various embodiments, the transmitter relays a discovery request message from a transmitter device to at least one remote user equipment.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a first sidelink device, the method comprising:

transmitting, over a sidelink interface, a periodic discovery message for performing discovery of a plurality of second sidelink devices, wherein the first sidelink device comprises a first relay user equipment (UE);

discovering the plurality of second sidelink devices over the sidelink interface; and transmitting, to a second relay UE or a base station, a discovery member list and a set of source layer 2 identifiers corresponding to the plurality of second sidelink devices discovered by the first sidelink device.

2. The method of claim 1, wherein the plurality of second sidelink devices is at least one remote UE.

3. The method of claim 1, further comprising determining the periodic discovery message using a default source-destination identifier configured to be received by all discoverable UEs.

4. The method of claim 1, further comprising receiving an event triggered discovery response message from the plurality of second sidelink devices, wherein the event triggered discovery response message indicates a new source layer 2 identifier or a change in the set of source layer 2 identifiers.

5. A first sidelink device, comprising:

at least one memory; and at least one processor coupled with the at least one memory and configured to cause the first sidelink device to:

transmit, over a sidelink interface, a periodic discovery message for performing discovery of a plurality of second sidelink devices, wherein the first sidelink device comprises a first relay user equipment (UE);

discover the plurality of second sidelink devices over the sidelink interface; and transmit, to a second relay UE or a base station, a discovery member list along with a set of source layer 2 identifiers corresponding to the plurality of second sidelink devices discovered by the first sidelink device.

6. The first sidelink device of claim 2, wherein the plurality of second sidelink devices is at least one remote UE.

7. The first sidelink device of claim 5, wherein the at least one processor is configured to cause the first sidelink device to determine the periodic discovery message using a default source-destination identifier configured to be received by all discoverable UEs.

8. The first sidelink device of claim 5, wherein the at least one processor is configured to cause the first sidelink device to relay a discovery request message from a transmitter device to at least one remote UE.

9. The first sidelink device of claim 5, wherein the at least one processor is further configured to cause the first sidelink device to receive an event triggered discovery response message from the plurality of second sidelink devices, and wherein the event triggered discovery response message indicates a new source layer 2 identifier or a change in the set of source layer 2 identifiers.

10. The first sidelink device of claim 5, wherein the at least one processor is further configured to cause the first sidelink device to receive a discovery response message from the plurality of second sidelink devices, and wherein the discovery response message comprises:

a list of source layer 2 identifiers of which each source layer 2 identifier of the list of source layer 2 identifiers corresponds to an application a remote UE;

a zone identifier of the remote UE;

a reference signal received value measured over the sidelink interface;

a periodicity of traffic;

a discovery purpose indication;

beam related information;

or some combination thereof.

11. The first sidelink device of claim 5, wherein the at least one processor is further configured to cause the first sidelink device to determine a response transmission based on the discovery member list, and wherein the response transmission is transmitted to a remote transmit UE to establish a relay connection with the remote transmit UE and a remote receive UE.

12. The first sidelink device of claim 2, wherein the at least one processor is configured to cause the first sidelink device to transmit the discovery member list as part of UE assistance information or radio resource control signaling.

13. The first sidelink device of claim 5, wherein the at least one processor is further configured to cause the first sidelink device to facilitate exchanging a candidate relay identifier between a remote UE and the base station.

14. A first sidelink device, comprising:

at least one memory; and at least one processor coupled with the at least one memory and configured to cause the first sidelink device to:

communicate, using a first sidelink interface, with a second sidelink device, wherein the second sidelink device communicates with a third sidelink device using a second sidelink interface; and receive a radio link failure (RLF) indication from the second sidelink device, wherein the RLF indication indicates a RLF condition for the second sidelink interface between the second sidelink device and third sidelink device, wherein the RLF indication further indicates at least one candidate sidelink device; and perform relay reselection based on the RLF indication from the second sidelink device by autonomously transmitting a broadcast discovery request message to the at least one candidate sidelink device.

15. The first sidelink device of claim 14, wherein the at least one processor is configured to cause the first sidelink device to transmit the broadcast discovery request message to the at least one candidate sidelink device.

16. The first sidelink device of claim 15, wherein the at least one processor is configured to cause the first sidelink device to transmit the broadcast discovery request message via radio resource control signaling.

17. The first sidelink device of claim 14, wherein the RLE indication indicates a number of consecutive packets lost, a channel busy ratio of a resource pool, a channel occupancy ratio of the resource pool, or some combination thereof.

18. A method performed by a first sidelink device, the method comprising:

communicating, using a first sidelink interface, with a second sidelink device, wherein the second sidelink device communicates with a third sidelink device using a second sidelink interface; and receiving a radio link failure (RLF) indication from the second sidelink device, wherein the RLF indication indicates a RLF condition for the second sidelink interface between the second sidelink device and third sidelink device, wherein the RLF indication further indicates at least one candidate sidelink device; and performing relay reselection based on the RLF indication from the second sidelink device by autonomously transmitting a broadcast discovery request message to the at least one candidate sidelink device.

19. The method of claim 18, further comprising transmitting a discovery request message to the at least one candidate sidelink device.

20. The method of claim 19, wherein the discovery request message is transmitted via radio resource control signaling.

* * * * *